United States Patent Office 2,945,865
Patented July 19, 1960

---

2,945,865
PHTHALIDES

Donald D. Wheeler and David C. Young, Midland, Mich., assignors to The Dow Chemical Company, Midland, Mich., a corporation of Delaware No Drawing. Filed Aug. 29, 1958, Ser. No. 757,933

5 Claims. (Cl. 260—343.3)

---

This invention relates to phthalides and particularly to those compounds represented by the formula

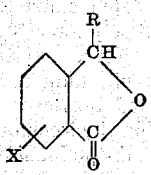

In this and succeeding formulae, R represents a substituted anilino radical having a hydrogen atom in at least one position ortho to the amino nitrogen and substituted in the benzene nucleus by at least one radical selected from the group consisting of phenyl, chloro, lower acyl, and benzoyl, and X is a member of the group consisting of chlorine and hydrogen. By "acyl" is meant radicals such as propionyl, butyryl, pentanoyl and hexanoyl derived from lower aliphatic acids.

The new compounds of the invention are light-colored crystalline solids somewhat soluble in organic solvents such as benzene, ethanol and acetone and are substantially insoluble in water. These compounds are useful as herbicides. They are also useful as parasiticides, adapted to be employed in germicidal and parasiticidal compositions.

The above compounds may be prepared by causing a phthalaldehydic acid having the formula

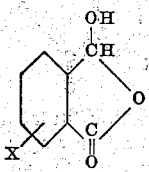

to react with an aromatic amine of the benzene series having the structure

RH to produce the desired phthalide and water of reaction. The terms "phthalaldehydic acid" and "3-hydroxyphthalide" refer to a compound having the structure

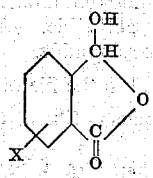

Phthalaldehydic acid is often represented in the literature as having the structure

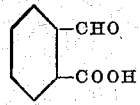

However, the acid employed in this invention and prepared as hereinafter described exists almost entirely in the 3-hydroxyphthalide ring structure, as indicated by its infrared absorption spectrum. Infrared data also indicate the phthalide products to contain the same characteristic ring structure.

The reaction conveniently may be carried out in an inert solvent as reaction medium and takes place readily in the temperature range of from 20° to 150° C. with the formation of the desired phthalide products and water of reaction. Suitable solvents include acetone, benzene, butanone, water and alcohol. Good results are obtained when substantially equimolar proportions of the reactants are employed.

In carrying out the reaction, phthalaldehydic acid and the aromatic amine are dissolved in or mixed with the reaction solvent. Mixing of the reactants oftentimes results in the development of heat of reaction. The reaction mixture is then heated for a period of from a few minutes to four hours to obtain the desired phthalide product. The latter usually precipitates from the reaction mixture during the heating as a crystalline solid. The mixture is then cooled to precipitate further product and the latter recovered from the mixture by filtration. The phthalide product may be purified, if desired, by washing with or recrystallizing from a suitable solvent.

The following examples illustrate the invention but are not to be construed as limiting.

*Example 1.—3-(2,4,5-trichloroanilino)phthalide*

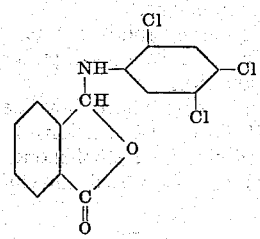

29.4 grams (0.15 mole) of 2,4,5-trichloroaniline, 22.5 grams (0.15 mole) of phthalaldehydic acid and 150 milliliters of acetone were mixed together and the resulting mixture heated on the steam bath under reflux for one hour. At the end of this period, about 50 milliliters of hot water was added to the reaction mixture and the mixture then allowed to cool. Crystalline 3-(2,4,5-trichloroanilino)phthalide product started to precipitate as the mixture cooled and further crystals were obtained by cooling in an ice bath. The solid product was recovered by filtration and washed with dilute acetone to obtain a purified phthalide product melting at 209°–210° C.

*Example 2.—3-(3,4-dichloroanilino)phthalide*

A solution of 81 grams (0.5 mole) of 3,4-dichloroaniline in 150 milliliters of acetone and a solution of 75 grams (0.5 mole) of phthalaldehydic acid in 150 milliliters of acetone were mixed together and heated on the steam bath for a few minutes whereupon a solid product precipitated. The latter was separated from the reaction mixture by filtration and washed with acetone to recover a purified 3-(3,4-dichloroanilino)phthalide product melting at 230°–231° C. in a yield of 116.3 grams or 86.5 percent of theoretical.

*Example 3.—3-(2-phenylanilino)phthalide*

A solution of 84.6 grams (0.5 mole) of 2-phenylaniline in 150 milliliters of acetone was mixed with a solution of 75.0 grams (0.5 mole) of phthalaldehydic acid in 150 milliliters of acetone and the resulting mixture heated on the steam bath for about 5 minutes. Thereafter, the reaction mixture was shaken whereupon a 3-(2-phenylanilino)phthalide product precipitated. The latter was recovered by filtration to obtain a slightly reddish white crystalline solid melting at 187°–189° C. in a yield of 144.8 grams or 96 percent of theoretical.

*Example 4.—3-(4-acetylanilino)phthalide*

A solution of 68 grams (0.5 mole) of p-aminoacetophenone in 150 milliliters of acetone was mixed with a solution of 75 grams (0.5 mole) of phthalaldehydic acid in 150 milliliters of acetone and the resulting mixture heated on the steam bath. After several minutes of heating a 3-(4-acetylanilino)phthalide product precipitated as a solid. The latter was recovered by filtration to obtain a light orange colored solid melting at 246°–247° C. in a yield of 130.3 grams or 97 percent of theoretical.

In similar preparations, the following compounds were prepared:

A 3-(4-chloroanilino)phthalide product having a melting point of 180°–182° C. by the reaction of phthalaldehydic acid and p-chloroaniline.

A 3-(4-phenylanilino)phthalide product having a melting point of 233°–234° C. by the reaction of phthalaldehydic acid and p-phenylaniline.

A 3-(2-chloroanilino)phthalide product having a melting point of 170°–171° C. by the reaction of phthalaldehydic acid and o-chloroaniline.

A 3-(4-benzoylanilino)phthalide product melting at 217°–219° C. by the reaction of phthalaldehydic acid and 4-aminobenzophenone.

A 3-(4-hexanoylanilino)phthalide product melting at 180°–182° C. by the reaction of phthalaldehydic acid and 4-aminohexanophenone.

A 3-(2-propionylanilino)phthalide product melting at 181°–183° C. by the reaction of phthalaldehydic acid and 2-aminopropionphenone.

A 3-(4-acetylanilino)-5-chlorophthalide product melting at 222°–224° C. by the reaction of 4-chlorophthalaldehydic acid and p-aminoacetophenone.

The phthalides of the present invention having the formula

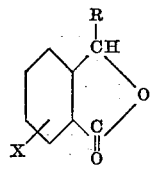

are useful as herbicides and particularly adapted to be employed for the control of the growth and germination of seeds. In a representative operation, 3-(2,4,5-trichloroanilino)phthalide and 3 - (3,4-dichloroanilino)-phthalide are dispersed in water to prepare aqueous compositions containing 100 parts by weight of one of the phthalide compounds per million parts by weight of ultimate composition. These compositions are applied to seed germination beds which have been prepared and planted with seeds of canary grass (*Phalaris canariensis*) at a dosage of about 0.152 acre inch of aqueous composition per acre. Other seed beds similarly prepared and planted are left untreated to serve as checks. The beds are covered and allowed to remain at about 70° F. for 1.5 weeks. At the end of this period, the beds are examined to ascertain the extent of control of germination that has been obtained. It is found that substantially complete control of the germination in the beds which are treated with the phthalide compound prior to seeding whereas no control of germination is found in the untreated check beds.

The phthalides of the present invention are also useful as parasiticides, particularly for the control of bacterial organisms. Thus, substantially complete inhibition of growth of bacterial organisms such as *Staphylococcus aureus*, *Salmonella typhosa*, *Acrobacter aerogenes* and *Penecillium digitatum* are obtained when solid nutrient agar containing a phthalide compound having the formula

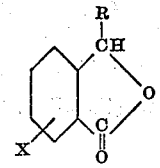

is streaked with one of the above organisms and incubated at 30° C. for three days.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant-boiling hydrochloric acid and ferric chloride solution to obtain phthalaldehydic acid as more fully disclosed in U.S. Patent 2,748,162.

The chlorophthalaldehydic acid employed in this invention may be prepared by first chlorinating o-xylene in the presence of ferric chloride in the temperature range of from 5° to 15° C. to obtain a mono-ring-chlorinated o-xylene. The ring chlorinated product is then photochlorinated to obtain $\alpha,\alpha,\alpha,\alpha,'\alpha'$-pentachloro-mono-ring-chlorinated o-xylene and the latter hydrolyzed in a manner similar to that described above for phthalaldehydic acid.

This application is a continuation-in-part of copending application Serial Number 595,843, filed July 5, 1956, now abandoned.

We claim:

1. A phthalide having the formula

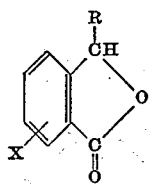

wherein R represents a substituted anilino radical, said substituted anilino radical having a hydrogen atom in at least one position ortho to the amino nitrogen and selected from the group consisting of monophenylanilino, monochloroanilino, trichloroanilino, monobenzylanilino and mono-lower-alkanoylanilino, and wherein X is a member of the group consisting of hydrogen and chlorine.

2. 3-(2,4,5-trichloroanilino)phthalide.
3. 3-(3,4-dichloroanilino)phthalide.
4. 3-(4-acetylanilino)phthalide.
5. 3-(2-phenylanilino)phthalide.

References Cited in the file of this patent

Glogauer: Berichte, Deut. Chem. Gesell., vol. 29, pp. 2036–2039 (1896).

Beilstein: Handbuch der Org. Chemie, vol. 18, p. 606 (1910).